United States Patent [19]

Liepe

[11] Patent Number: 4,783,715

[45] Date of Patent: Nov. 8, 1988

[54] AUTOMATIC HIGH-SPEED COLOR CRT DEGAUSSING SYSTEM

[75] Inventor: Steven F. Liepe, Tualatin, Oreg.

[73] Assignee: Tektronix, Inc., Beaverton, Oreg.

[21] Appl. No.: 182,651

[22] Filed: Apr. 18, 1988

[51] Int. Cl.$^4$ .................. H01F 13/00; H01J 29/06
[52] U.S. Cl. ......................................... 361/150; 315/8
[58] Field of Search ........................... 361/150; 315/8

[56] References Cited

U.S. PATENT DOCUMENTS 4,489,253 12/1984 Godawski .......................... 315/8
4,737,881 4/1988 Haferl ............................. 361/150

*Primary Examiner*—Michael L. Gellner
*Assistant Examiner*—David Porterfield
*Attorney, Agent, or Firm*—William O. Geny

[57] ABSTRACT

A degaussing system for a CRT includes a voltage source, which is enabled by power-up of the CRT, coupled to a tank circuit including a degaussing coil and a capacitor. A voltage sensing network connected in parallel with the tank circuit senses the voltage across the capacitor and when that voltage rises to a predetermined threshold, and actuating signal is provided which turns on a latching switch circuit which enables a switch connecting the tank circuit to ground. This allows it to oscillate, taking the metal components of the CRT through a decreasing series of hysteresis loops as the oscillation decays. The latching switch circuit maintains the switch in an on position until power-down of the CRT, thus maintaining all except R1 which aids grid regulation of the components of the degaussing system, in a low voltage state until degaussing becomes necessary once again.

8 Claims, 1 Drawing Sheet

AUTOMATIC HIGH-SPEED COLOR CRT DEGAUSSING SYSTEM

BACKGROUND OF THE INVENTION

The following invention relates to a degaussing network system for demagnetizing a color CRT's steel aperture grill which may become magnetized due to changes in the position of the CRT relative to the earth's magnetic field and the like.

Color CRT displays frequently include degaussing networks for ridding the metal components of the CRT of magnetization caused by the earth's magnetic field or spurious fields produced by motors and other devices. Typical degaussing circuits of this type are shown in Frantz el al., U.S. Pat. No. 4,535,270 and in Truskalo, U.S. Pat. No. 4,636,911. The Frantz et al. '270 patent discloses a degaussing circuit which comprises a storage capacitor which stores a charge and applies that charge to a degaussing coil as a switch is turned on, permitting the coil and the capacitor to oscillate. The rapidly decaying oscillation of this circuit takes magnetized components of the CRT through a series of hysteresis loops and effectively reduces the magnetization of these components to very low levels. The Trusklo '911 patent is an improvement of the Frantz et al. device, and provides a second inductance connected in parallel with the degaussing coil to improve the "Q" of the oscillating circuit so that more oscillations can occur within the decay period of the oscillator network.

The Frantz and Trusklo devices time the occurrence of the degaussing operation relative to the CRT's vertical deflection pulses. This requires a rather complicated circuit arrangement to ensure that the degaussing current decays substantially to zero during a time when the vertical deflection current is substantially zero in order that no stray magnetic fields are created. Once degaussing is complete in both of these devices, however, a high voltage from the horizontal deflection power supply remains on the storage capacitors to await the next degaussing sequence. This high voltage remains on these parts as long as the CRT is turned on. This maintains a large, and potentially dangerous, potential during non-use periods, which is most of the time, and places considerable voltage stress on these parts of the circuit.

SUMMARY OF THE INVENTION

The present invention provides a degaussing network which is operative upon power-up of the CRT and which then reduces the voltage in the degaussing network to essentially zero to avoid high voltage stress on the degaussing network components. The invention also obviates the need for complex timing circuitry since it is effective nearly instantaneously upon power-up of the CRT, and is not triggered by any external timing circuit.

The degaussing network comprises a voltage source enabled by power-up of the CRT, a tank circuit comprising a degaussing coil and a capacitor coupled to the voltage source, and a voltage sensing network connected in parallel with the tank circuit. The voltage sensing network senses the voltage across the tank circuit capacitor and provides an actuating signal when a predetermined threshold voltage is reached. A latching circuit is responsive to the threshold voltage for enabling a switch which connects the tank circuit to ground, thus allowing it to oscillate and demagnetize the CRT components in the conventional manner. The latching circuit includes means for keeping the switch on until power-down of the CRT.

The network thus depends solely upon the sensing of a voltage threshold upon power-up of the CRT, and thereafter latches the tank circuit to ground so that high voltages are not maintained across any of these components while the CRT is otherwise in use. Whenever degaussing is necessary, the CRT is merely turned off, disabling the latch, and turned back on again. At this which time the network will go through another degaussing cycle.

The threshold voltage is sensed by a plurality of zener diodes connected in series across the tank circuit. When threshold is reached, the zener diodes conduct, turning on an amplifier which latches a silicon control rectifier (SCR) which connects the tank circuit to ground. The amplifier circuit is constructed so that it stays on once threshold has been reached, as long as the CRT is in a power-up mode. Only when the voltage supplies for the amplifier are cycled off via a power-down mode for the CRT, is the latch released and the degaussing network disconnected from ground.

It is a primary object of this invention to provide a degaussing network for a CRT which is effective only on power-up of the CRT and which is thereafter grounded thereby maintaining its components in a low voltage state.

A further object of this invention is to provide a degaussing network which does not require any external timing circuitry but is actuated upon reaching a predetermined threshold voltage.

Yet a further object of this invention is to provide a degaussing network which utilizes voltage from the grid supply for the CRT and therefore does not require a high voltage source of its own.

The foregoing and other objectives, features and advantages of the present invention will be more readily understood upon consideration of the following detailed description of the invention taken in conjunction with the accompanying drawings.

DETAILED DESCRIPTION OF THE INVENTION

Figure 1:
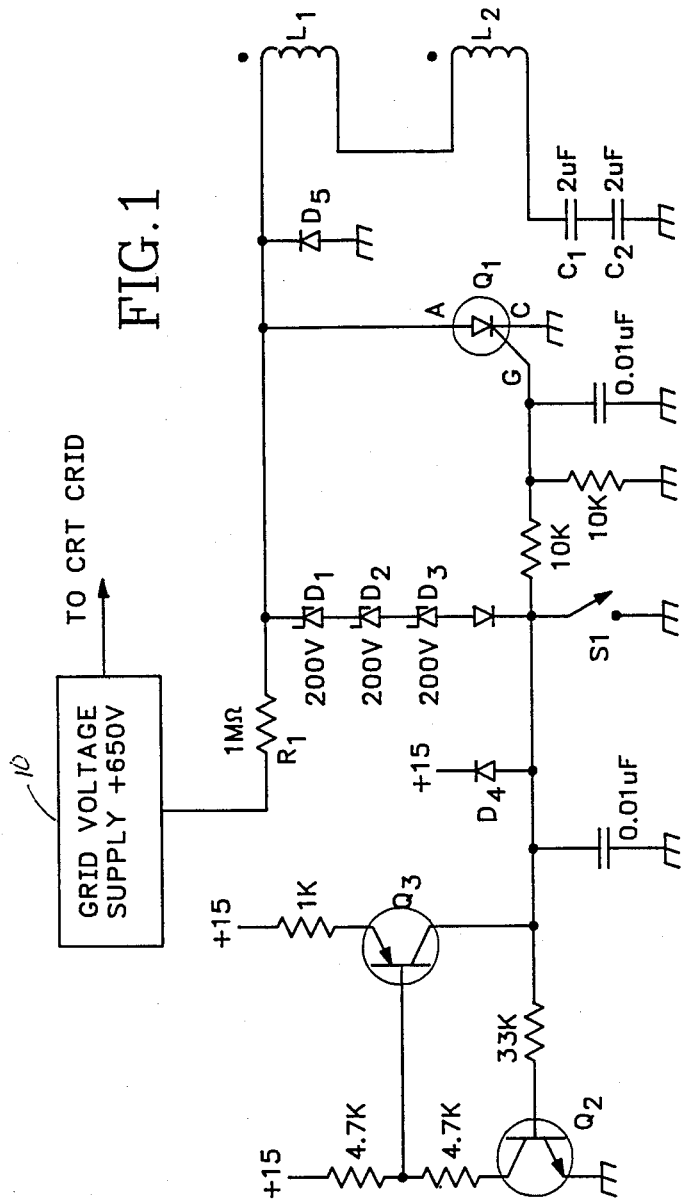
FIG. 1 is a schematic diagram of a degaussing network comprising the present invention.

A voltage source 10 which may, for example, be the source of voltage for the grid of the CRT, is connected to a relatively large sensing resistor R1. R1 is connected to a tank circuit which includes a pair of degaussing coils L1 and L2 connected in series with capacitors C1 and C2. One side of the tank circuit is connected to ground via the opposite plate of C2. The other path to ground for the tank circuit leads through SCR Q1. Voltage across capacitors C1 nd C2 is sensed by zener diodes D1, D2 and D3. All three of these zener diodes are 200-volt diodes, so as soon as the voltage across capacitors C1 and C2 reaches 600 volts, the zeners conduct, and current is applied to the base of Q2, turning it on. When Q2 turns on, Q3 turns on providing a current sufficient to turn on the SCR Q1. When Q1 turns on, the tank circuit formed by capacitors C1 and C2 and coils L1 and L2 oscillates in a decaying fashion thereby saturating the metal components of the CRT and driving them through repeated hysteresis curves, thus bringing the stored magnetic field in these components down close to zero. The coils L1 and L2 are oval-shaped loops which are positioned on each side of the CRT and are approximately perpendicular to the plane of the screen. Diode D5 provides a return path from ground for the oscillating tank circuit.

Once Q2 and Q3 are turned on by the voltage across the zener diode array D1, D2, D3, they are maintained in a latching position since the collector of Q3 is tied to the base of Q2. This means that as long as the instrument is turned on, providing Q2 and Q3 with a 15-volt supply, Q1 will remain on. Thus, the voltage across R1 will be shunted to ground as long as the CRT is in a power-up mode, and no charge can build up across capacitors C1 nd C2. The result is that the components of the degaussing system experience very low voltage except during the degaussing cycle. The latch also ensures that the switch Q1 will remain on during zero current crossing to allow complete decay to zero current without prematurely disabling Q1 due to lack of hold current.

Degaussing is accomplished by using the grid voltage supply 10. Therefore, no separate power supply is needed to accomplish this function. The grid voltage supply 10 is maintained at a relatively constant level by the constant load represented by voltage sensing resistor R1.

When the CRT is turned off, power is removed from Q2 and Q3, thus permitting Q1 to open. When power is turned back on, the degaussing network will automatically complete another degaussing cycle since the switching action of the network is dependent solely upon a triggering current provided by the zener diode array once it reaches a threshold voltage of 600 volts. Thus, the circuit is not dependent upon any external timing mechanism and automatically performs the degaussing cycle every time the CRT is turned on. Once on, however, the components of the degaussing system are maintained in a low voltage state since Q1 remains on as long as the CRT is in a power-up mode.

If desired, the degaussing operation could be implemented by a pushbutton switch S1 (shown in phantom outline) grouding the collector of Q3. If this were to occur, Q1 would open. Thereafter, whenever the input to Q2 is ungrounded, Q1 would be off and voltage from R1 would begin to build up across C2, C3 until the zener array retriggered Q2, Q3 thus turning on Q1.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:
1. A degaussing system for a CRT comprising:
   (a) a switchable voltage source;
   (b) tank circuit means comprising degaussing coil means and capacitor means coupled to said voltage source;
   (c) voltage sensing network means for sensing the voltage across said capacitor means and for providing an actuating signal when a predetermined threshold voltage has been reached; and
   (d) latching switch circuit means responsive to said actuating signal for enabling a switch, said switch connecting said tank circuit to ground, and including means for maintaining said switch in an on position until said switchable voltage source is turned off.
2. The degaussing network of claim 1 wherein said voltage sensing network means comprises zener diode means connected in parallel with said tank circuit means which conducts at said predetermined threshold voltage.
3. The degaussing network of claim 1 wherein said switchable voltage source provides voltage for the grid of said CRT and said voltage sensing network means includes a relatively large resistor to provide voltage regulation for said grid.
4. The degaussing network of claim 1 wherein said actuating signal is a low current signal and wherein said latching switch circuit means further includes amplifier means for increasing the gain of said low current signal to a level sufficient to trigger said switch.
5. The degaussing network of claim 4 wherein said switch is a silicon control rectifier.
6. The degaussing network of claim 4 wherein said amplifier means maintains said switch in an energized state as long as said CRT is in a power-up mode.
7. The degaussing network of claim 1 wherein said switchable voltage source is energized upon power-up of said CRT.
8. The degaussing network of claim 1 wherein said latching switch circuit means comprises pushbutton switch means for turning said switch off.

* * * * *